United States Patent Office.

WILLIAM GEORGE STRYPE, OF WICKLOW, IRELAND.

PROCESS OF PREPARING DRIED BLOOD.

SPECIFICATION forming part of Letters Patent No. 318,826, dated May 26, 1885.

Application filed February 6, 1884. (No specimens.) Patented in England January 5, 1884, No. 787.

*To all whom it may concern:*

Be it known that I, WILLIAM GEORGE STRYPE, a subject of the Queen of Great Britain and Ireland, and residing at Wicklow, Ireland, have invented certain Improvements in the Manufacture of Dried Blood or Manure, (for which I have obtained a patent in Great Britain, No. 787, dated January 5, 1884,) of which the following is a specification.

My invention relates to improvements in the treatment of the blood of animals, so as to facilitate the process of preparing it for use as a manure or for other purposes where it is important to arrest decomposition and preserve it, and at the same time to abate the nuisance which has hitherto attended the preparation of blood for such purposes.

Sulphate of alumina or alum is known to have the power of abating the nuisance attending the process of drying blood; but hitherto it has not been found practicable to utilize this power in a commercially-available manner, owing to the difficulty in properly associating such materials and the blood together.

According to my invention I form sulphate of alumina or alum into a solution and add such solution to the blood as soon as conveniently may be after the blood is obtained, and I thoroughly incorporate them together. This I am able to effect in a satisfactory way by preparing the sulphate of alumina or alum into a solution previously to adding it to the blood, which previous preparation causes the said sulphate of alumina or alum to become readily incorporated with the blood in such a manner as to effectively abate the nuisance which has hitherto arisen from the preparation of blood, and allow the drying to be proceeded with unattended by objectionable inconveniences.

A proportion of about one part of sulphate of alumina or alum to fifty parts of blood fresh from animals will be found suitable; but I do not bind myself to that proportion.

The solution may be prepared with one or more parts of water to one part of sulphate of alumina or alum; but the best proportion can easily be settled to suit the circumstances of each case. If warm water be employed, the sulphate of alumina or alum will be dissolved more readily. The prepared solution of sulphate of alumina or alum is added in any convenient way and stirred up with the blood in collecting-tanks made of timber or other suitable material.

It will be found a useful practice to flush the floors or conduits leading from the slaughter-room to the collecting-tanks with the necessary quantity of the prepared solution of sulphate of alumina or alum, which will thus preserve any blood adhering to the floors and conduits from decomposition.

The mixture of the solution of sulphate of alumina or alum and blood may be allowed to stand in the tanks, in order that the sulphate of alumina or alum may act more completely upon the blood, and subsequently the blood may be dried, either naturally or artificially, to prepare it for use.

The blood, when dried after the treatment with the solution, may be washed with water to get rid of excessive sulphate of alumina or alum; but it should be immediately re-dried if washed in this manner.

I do not claim, broadly or generally, the use of sulphate of alumina or alum for treating blood; but

What I claim as my invention is—

The herein-described process of preparing dried blood as a manure or for other purposes, said mode consisting in first forming sulphate of alumina or alum into a solution, then adding this solution to the blood, and finally drying the blood thus treated, substantially as set forth.

In testimony whereof I have signed my name to this specification in the presence of two subscribing witnesses.

W. G. STRYPE.

Witnesses:
  J. L. MORGAN,
    *1 College Street, Dublin.*
  THOMAS PHILPOT HAYES,
    *7 Anglesea Street, Dublin.*